INVENTORS.
CECIL E. ADAMS
LEO H. DILLON
GEORGE M. HIPPLE
GLENN A. NORRIS
WILLIAM F. WEESE
BY Donald J. Detrich United States Patent Office 3,250,293
Patented May 10, 1966

3,250,293
ELECTRIC AND FLUID PRESSURE OPERATED
VALVE MECHANISM
Cecil E. Adams, Leo H. Dillon, George M. Hipple, and Glenn A. Norris, Columbus, Ohio, and William F. Weese, South Redondo Beach, Calif., assignors to American Brake Shoe Company, New York, N.Y., a corporation of Delaware
Continuation of application Ser. No. 855,629, Nov. 27, 1959. This application Oct. 17, 1963, Ser. No. 317,406
9 Claims. (Cl. 137—528)

This invention relates to electric and fluid pressure operated control valve mechanisms.

This application is a continuation of our co-pending application Serial No. 855,629, filed November 27, 1959, now abandoned.

The principal object of the invention is to provide an electric and fluid pressure operated control valve apparatus which may be employed in, or in connection with other valves in, fluid systems to provide new modes of operation of the fluid systems whereby new results accompanied by more accurate control and other advantages heretofore unattained can be had.

In carrying out the principal object of the invention, it it another object to provide an improved electric and fluid pressure operated control valve apparatus by which a new approach in servo valve functions is introduced into the art. The prior art electro-hydraulic valve devices with which the present invention is most nearly related are customarily connected into a circuit which supplies their inlet ports with fluid under constant pressure and these valves have no control over this pressure, instead they control the speed of operation or the position of the device in the circuit which is being operated by controlling the volume of fluid supplied to it. These valves are actually directional control valves having the characteristic of being able to control the rate of flow of fluid in addition to controlling the direction thereof and they all include the common feature of having electrically controlled means for shifting or positioning their flow directing means in response to an electric current. The control of these valves may be modified as by the action of a feed back device, the operation of which is controlled by the speed or position of the device which is being operated.

More recent developments in the art have added to the prior art valves an hydraulic feed back system from the device being operated to the flow directing means of the valves which system attempts to function to shift the flow directing means of the valve to compensate for changing work loads which may be encountered by the device being operated.

Valve devices including the last mentioned feature, namely the hydraulic feed back system, are sometimes erroneously referred to in the art as pressure control valves and these valves are not to be confused with the present invention since all of the known prior art valves of this type merely function as distributing valves and have no control over the primary pressure, that is, the pressure which is supplied to them from the system and this pressure must be controlled by other valve devices in the system which operate completely independently of the subject valves.

The above mentioned prior art valves were all developed to accomplish servo functions in a system, but they have no ability to control the maximum pressure generated by the pump. It is common knowledge that all fluid operated circuits, devices or systems which receive their fluid from a source of pressure such as a pump must be provided with a relief valve which functions to control or limit the maximum pressure generated by the pump. A typical simple hydraulic circuit includes a pump, a relief valve, a directional control valve such as a four way valve, and a device such as a motor to be operated. More complicated circuits employ additional valves such as sequence, pressure reducing and additional relief valves for the specific control of pressures in certain portions of the system.

The prior art valves discussed above are directional flow control valves but even so they are suitable only for a specialized usage and then only in a small percentage of the above described circuits and they can not perform any of the functions of a relief, sequence or pressure reducing valve.

Prior to this invention substantially all pressure controlling valves included a spring loaded valve of one type or another and the valve function was controlled by the preloading of the spring which in most cases was adjusted manually at the valve. One such valve employs a motor with reduction gearing and a screw for adjusting the preloading of the mentioned spring, but no valve was known whereby the pressure setting of the valve is adjusted electrically and in which the pressure setting is determined and maintained by a continuous direct current applied to the valve from an adjustable source and in which the value of the hydraulic pressure controlled by the valve is proportional to the value of the current input.

By this invention, there is provided for the first time a general purpose line of pressure control valves which can be employed in any hydraulic circuit of any type and which introduces into the art the nimbleness and flexibility that can be provided by an electrical input to a transducer which operates the control mechanism of the valve.

By this invention, there is also provided for the first time a valve including the features set forth in the preceding paragraph which may be employed as a relief, sequence and, with modification, as a pressure reducing valve.

It is another object of the invention to provide for the first time an electro-hydraulic valve mechanism by which a new approach in the servo art can be had. The new approach being to provide a valve which can directly cause the pump in a system to develop at all times exactly that amount of pressure which is required to drive the motor in a manner dictated by the electrical input to the valve whereby the motor will perform the exact function desired of it, in other words, a valve which will cause the pump to develop at all times only that pressure in the system which is necessary to cause the motor to operate at a given condition as determined by the setting or current input to the valve, whereas in the prior art servo systems the pump developed a pressure at all times which was substantially in excess of that required at any time to operate the motor.

Another object of the invention is to provide a valve of the above mentioned type wherein the control functions of the valve mechanism are under the sole influence of a force created by an electromechanical transducer which is opposed by a hydraulic force and in which a transducer which develops the force contains no permanent magnets, springs, torsion bars and the like to create unwanted forces which must be cancelled by expensive or precision manufacture and/or precision adjustments of the mechanism.

Another object of the invention is to provide an electric and fluid pressure operated control valve apparatus which may be adjusted from a position remote from the apparatus, as for example, from a control panel positioned at some distance from the valve apparatus.

Another object of the invention is to provide an electric and fluid pressure operated control valve device including features which may be employed with particular advantage to provide improved control of pressure reducing, relief, servo, sequence, and other valve functions.

In the prior art electrohydraulic valve devices with which the present invention is most nearly related there is a continuous loss of pilot control fluid through the valves even when the valves are being maintained in their neutral, standby or inoperative positions and this continuous drain of fluid from the high pressure portion of the systems in which the valves are located causes unnecessary heat to be generated in the system, the erosion of precision parts of the valves, and it requires increased horsepower input to the systems of which the valves form a part. Accordingly, it is a further object of this invention to provide an electro-hydraulic control valve mechanism which does not require a continuous flow of pilot control fluid through it when it is in a neutral or standby condition and which when it is not in standby condition permits only that exact volume of pilot fluid to escape from the high pressure portion of the system which is necessary to control a pressure differential or pressure drop to which the valve responds to change its condition.

The prior art valves with which this invention is most nearly related must be carefully engineered for each specific inlet pressure to prevent the loss of pilot fluid from being excessive, and it is a further object of this invention to provide an electrohydraulic valve which without structural changes of any kind can operate from very low to very high inlet pressures wherein the pilot flow allowed to escape will not increase excessively with an increase in system or inlet pressure.

Another object of the invention is to provide an improved electric and fluid pressure operated control valve unit which may be employed with advantage and without modification in connection with any of a plurality of second fluid pressure operated valves for providing improved control of the operation of the latter.

In carrying out the foregoing objects, it is another object of the invention to provide an electric and fluid pressure operated valve device which controls a fluid function accurately and in proportion to the amount of electric current supplied to the device and which may be adjusted infinitely and quickly throughout its range of adjustment by the adjustment of the electric current applied to it.

It is still another object of the invention to provide structure whereby the foregoing objects may carried out.

Further objects and advantages of the present invention will be apparent from the following description, reference being had to the accompanying drawings wherein a preferred form of embodiment of the invention is clearly shown.

Figures 1, 2, 3:
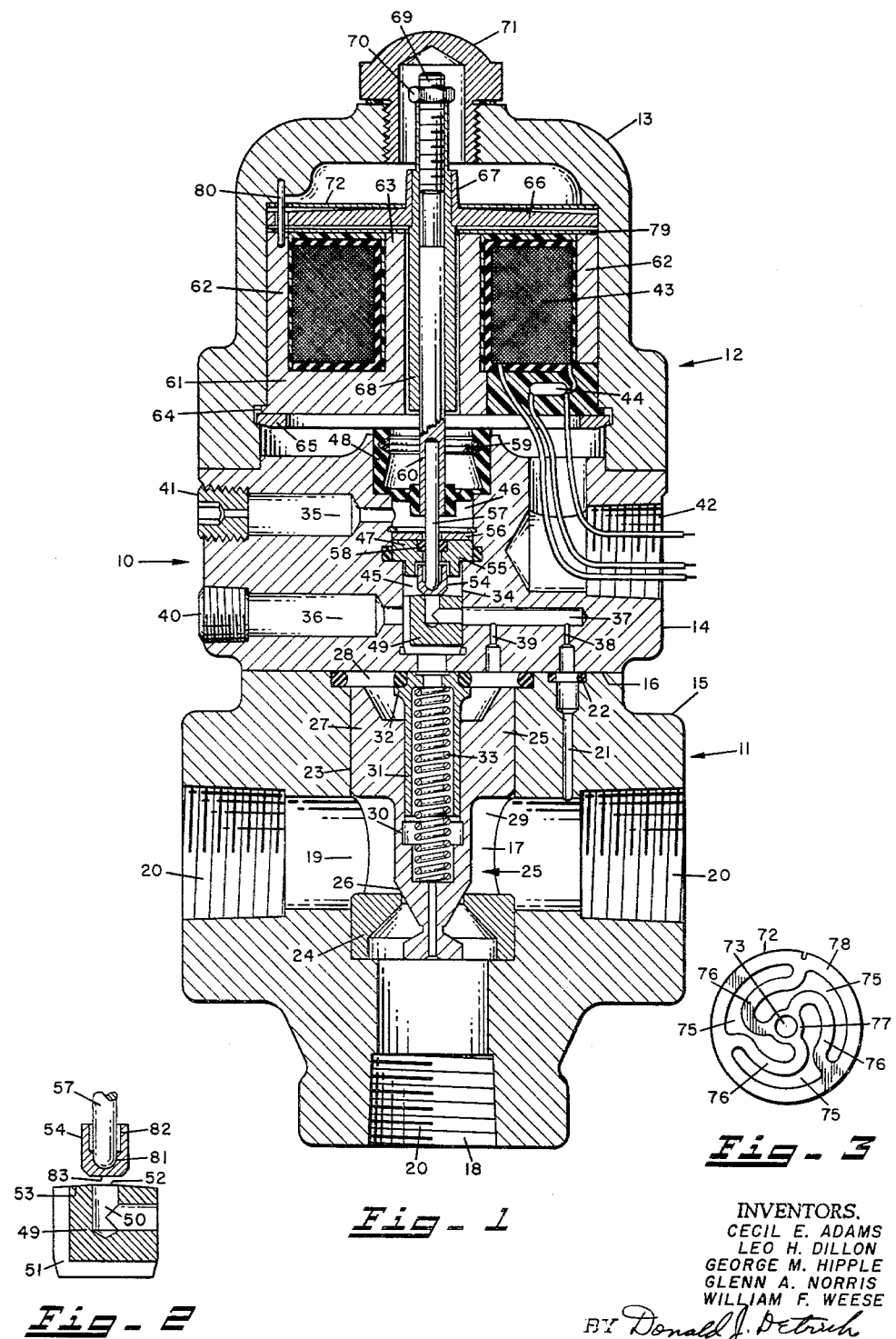
FIG. 1 is a view in section of a valve apparatus including the features of the invention, the apparatus including a pressure differential operated main valve adapted to function in a hydraulic system and an electrically and hydraulically operated control valve device for determining or controlling the operation of the main valve.
FIG. 2 is a view in section on an enlarged scale of elements of a valve which is employed in the control section or part of the apparatus seen in FIG. 1.
FIG. 3 is a view on a reduced scale of a thin wheel-like diaphragm type guide element employed in the transducer of the electrically and hydraulically controlled valve device seen in FIG. 1.

The particular control valve apparatus 10 employed in the drawings to describe the invention includes a main valve assembly 11 adapted to operate in a hydraulic system and an electrically and hydraulically operated control valve assembly 12 for controlling the operation of the main valve assembly 11. As shown in the drawings, the main valve assembly 11 and the control valve assembly 12 are contained within a common body, casing or housing comprised of three body elements 13, 14 and 15. The body element 14 is attached to the body element 15 and the body element 13 is attached to the body element 14 by screws, none of which are shown in the drawings.

The body element 15 is a casting which is generally of cross-shaped configuration when viewed from either side and it is provided with a flat generally circular top 16 from which a stepped central vertical bore 17 extends through the body to a fluid outlet port 18. A transverse bore 19 in the body 15 intersects the vertical stepped bore 17 and forms a fluid pressure inlet or through passageway in the body 15. The port 18 as well as the ends of the bore 19 are threaded, as at 20, for permitting the valve body element 15 to be connected into a hydraulic system. The body 15 is also provided with a vertical bore or passageway 21 which extends from the high pressure bore or passageway 19 to the flat top 16 of the body element 15 where it is enlarged to receive an O-ring 22.

The bore 17 forms a cylinder 23 into the bottom of which a valve seat 24 is pressed against a shoulder and this cylinder receives a combination piston and poppet type valve 25 including a valve element 26 adapted to engage and close the seat 24 and a piston portion 27. The piston portion 27 divides the cylinder 23 into an upper control pressure chamber 28 and a lower pressure chamber 29, the latter of which is in constant communication with the high pressure passageway or bore 19. The piston valve element is provided with a stepped central or axial through-bore 30 the larger diameter upper portion of which slidably receives a piston 31 which may balance the area on the top of the piston 27 which is exposed to pressure in the control chamber 28 with that area on the bottom of the piston 27 which is exposed to the pressure in the pressure chamber 29. In the particular embodiment shown, the piston 31 is slightly smaller in diameter than the opening in the valve seat 24. The upper end of the area balancing piston 31 has a small flange 32 projecting radially outwardly therefrom which receives an O-ring and it is formed to include a central internal socket which receives a compression type coil spring 33 which abuts the wall at the upper end of the area balancing piston 31 and a shoulder in the valve element 25 and urges the valve element downwardly to close the opening in the valve seat 24. The area balancing piston 31 is also provided with a central opening in its upper end wall whereby fluid may flow through it and the bore 30 in the piston 25 to reach the outlet port 18.

The body element 14 includes a flat generally circular bottom surface adapted to mate with the top surface 16 of the body element 15 and to sealingly engage the O-ring 22 as well as the O-rings which are carried by the upper end of the area balancing piston 31 and the cylinder 23. The body element 14 is also provided with a stepped central bore 34 the axis of which is aligned with the axis of the bore 23 in body member 15 and it is joined at spaced points by horizontally extending bores 35, 36 and 37. The bore 37 is connected with the bore 21 in body 15 and with the control pressure chamber 28 by a pair of restrictors in the form of orifices 38 and 39, respectively, and the bore 36 is closed by a solid plug 40 while bore 35 is partially closed by a breather or vent plug 41. The body element 14 is also provided with an internally threaded passageway 42 through which insulated electric wires pass to reach the electric coil 43 and thermistor 44 of an electro-mechanical transducer assembly which is contained within the body member 13.

The bore 34 is divided into two chambers, one a wet chamber 45, and the other a dry chamber 46, by a seal and guide assembly 47 and a diaphragm in the form of a flexible boot 48 which may be made of neoprene or any other suitable flexible material. A cylindrical valve seat insert 49 (see FIGS. 1 and 2) is pressed into that portion of the stepped bore 34 which cooperates in forming the wet chamber 45 and against a shoulder at one end thereof. This valve seat 49 is provided with a right angled passageway 50 formed by two intersecting bores which connect the bore 37 in the body 14 to the center of the upper end or valve seat of the insert 49. The valve seat insert 49 also includes a fluid conducting groove 51 which extends axially along its side and across its bottom to connect the seat chamber 45 with the bore 36 and with a small diameter opening at the bottom end of the stepped bore 34 which opening is aligned and communicates with the opening in the top of the area balancing piston 31.

The upper end of the valve seat insert 49 is provided with a circular flat surface 52 which surrounds the exit of the passageway 50 and from this flat surface 52 it is tapered downwardly and outwardly, as at 53, in a cone shape to its outside cylindrical walls. The flat portion 52 is provided to form a valve seat against which the flat bottom surface of a cup shaped valve element or poppet 54 is urged and the cone shaped surface 53 surrounding this flat portion is provided to reduce or eliminate friction upon fluid flowing across it from between the valve element 54 and that flat circular seat 52.

The valve element 54 is contained within the wet chamber 45 and its upper end fits loosely within an inverted cup formed in part by a cylindrical wall extending from the lower or bottom side of the seal and guide assembly 47. The clearance between the valve element 54 and the cup on the guide and seal assembly 47 is such as to permit the valve element 54 to move from the valve seat 52 and the side walls of the inverted cup on the seal and guide assembly 47 normally do not contact the side walls of the valve element 54.

The seal and guide assembly 47 includes a circular disk 55 having cylindrical outer walls and this disk is inserted into that portion of the bore 34 which cooperates in forming the dry chamber 46 and against a shoulder therein which is adjacent the upper end of the wet chamber 45. An O-ring seal which is contained within an annular groove in the bore 34 adjacent the shoulder engages the cylindrical outer wall of the disk 55 and seals it to the bore. The disk 55 is retained against axial movement in the bore 34 by a washer 56 and a snap ring, the latter being seated in an annular groove in the wall of the bore 34. The disk 55 is also provided with a central axial bore through which an operating rod 57 for the valve formed by the element 54 and seat 52 extends. This central bore is provided with a groove adjacent its top in which an O-ring 58 is inserted and this O-ring is held in the groove by the bottom surface of the washer 56.

It is pointed out that the rod 57 does not contact either the disk 55 or the washer 56 and that it is supported by the O-ring 58. By this means the rod 57 is sealed with the guide assembly 47 in a substantially frictionless manner, because the axial motion of the rod 57 is generally in the nature of not more than two thousandths of an inch under which conditions the O-ring 58 forms an anti-friction bearing since it tends to roll upon the rod 57 as the latter is reciprocated.

From the foregoing, it will be seen that the seal and guide assembly 47 divides the bore 34 into the two chambers 45 and 46 and it will be apparent from FIG. 1 of the drawings that the upper end of the dry chamber 46 is closed by the previously mentioned flexible boot 48 which is inserted into the bore 34 and against a shoulder therein. An expansible type coil spring 59 retains the boot 48 in the bore 34 and the boot is provided with a thickened elastic central portion having a bore which surrounds and sealingly elastically grips a non-magnetic brass shaft 60 which carries the rod 57.

The body element 13 is cast of non-magnetic material such as aluminum, and it is bored to receive a core 61 in which the coil 43 and thermistor 44 of the transducer assembly are housed. The core 61 and an armature disk 66 which is positioned above it are preferably formed of material which has high magnetic permeability and low hysteresis and in one embodiment of the invention an ingot iron is employed to form them and after they are formed they are annealed or heat treated in a reducing atmosphere whereby they will have low hysteresis characteristics and improved permeability. The core 61 is a cup shaped cylinder having side walls 62 which provide magnetic poles and a hollow center post 63 which also provides magnetic poles. The coil 43 is embedded in an insulating plastic material in the core 61 and the thermistor 44 is embedded in the same plastic material in a notch-like opening formed in the bottom of the core 61. The outside diameter of the core 61 is such as to have a close slidable fit with the bore in the body element 13 and it is provided with a peripheral flange 64 which abuts a shoulder on the body element 13. The shoulder 64, and consequently the core 61, is clamped to the body element 13 by a snap ring 65 provided with one tapered side which seats against one side of a groove in the body element 13.

The electromagnet above described including the core 61 and coil 43 operates an armature which includes the disk 66 which has a hollow hub 67 into which a tube 68 of non-magnetic material is pressed. The armature disk 66 extends over the outside magnetic poles formed by the side walls 62 and the tube 68 extends freely through the center post or poles 63 and the core 61. The armature disk 66 does not contact the body element 13. The shaft 60 fits snugly but slidably axially within the tube member 68 of the armature and its upper end is abutted by an adjusting screw 69 which is threaded into the upper end of the tube 68 and which is provided with a locking nut 70. An externally threaded hollow plug 71 which covers the screw 69 and nut 70 is threaded into the body member 13.

The upper end of the armature assembly including the disk 66 and tube 68 is supported against lateral movement by a thin diaphragm 72 of non-magnetic material. This diaphragm 72 (see FIG. 3) is provided with a central opening 73 which fits snugly around the tapered hub 67 of the disk 66 and its outer edge abuts the walls of the bore in the housing member 13. In order that the diaphragm 72 may support the armature for substantially unrestrained axial movement with substantially no lateral movement, the diaphragm 72 is cut out as at 75 to provide curved flexible connecting portions or spokes 76 between its hub 77 and rim 78 which rim engages the body element 13 at its peripheral edge and its top.

A thin spacer washer 79 which is also formed of non-magnetic material is positioned between the armature disk 66 and the magnetic poles formed by walls 62 and center post 63 of the core 61. This spacer washer 79 does not contact the tube portion 68 of the armature, but its peripheral edge preferably abuts the body element 13 in order to prevent movement of the spacer washer with respect to it and the core 61.

Rotation of the diaphragm 72, the spacer washer 79 and the core 61 with respect to each other and the body element 13 is prevented by a non-magnetic pin 80 which extends through the members 72, 66 and 79 and into aligned openings, one in the body element 13 and one in the core 61. The opening in the armature disk 66 through which pin 80 extends is of a larger diameter than that of the pin 80 in order that should the disk 66 contact the pin 80 during operation of the device there will be substantially no frictional resistance between them, and the pin 80 is extended through the disk 66 for the purpose of holding it against rotation during adjustment of the screw 69 and nut 70.

The valve mechanism 10 described above is an electric and fluid pressure controlled relief type control valve adapted to have its transverse bore 19 connected with or into a conduit in which it is to control fluid pressure. When the valve mechanism 10 is so connected, its outlet port 18 will usually be connected to a tank or reservoir which is under atmospheric pressure.

It will be apparent from the following description that the main valve assembly 11 is operated by a pressure differential and the spring 33 and that when the valve mechanism 10 is connected as above described and its transducer is closing the valve 52, 54, fluid pressure in the transverse bore 19 and the chamber 29 is applied to the underside of the piston portion 27 of the valve element 25 and this same pressure is also applied to the chamber 28 and the top of the piston portion 27 through the restricted passageway including the passageway 21, the orifice 38, bore 37 and orifice 39. Since the areas on the top and bottom of the piston portion 27 which are exposed to the fluid pressure are substantially equal, the valve element 25 will be urged downwardly by the spring 33 and its valve portion 26 closes the seat 24 and isolates the outlet port 18 from the bore 19.

The pressure limiting and shut-off valve 52, 54 in the chamber 45 and the orifice 38 function to control the pressure differential, i.e., the differences in pressure in the chambers 28 and 29 and when fluid is permitted to flow through the valve 52, 54 the fluid enters the wet chamber 45 and flows to the outlet port 18 through the groove 51, the aligned openings in the bottom of bore 34 and the top of the area balancing piston 31, and through the piston 31 and the center of the valve element 25 to port 18.

It will be seen that when fluid pressure in the transverse bore 19, chambers 28 and 29 and the passageways 21 and 37 which acts upon the valve element 54 overcomes the magnetic force of the transducer that fluid will begin to flow through the pressure limiting and shut-off valve 52, 54 and that a pressure drop across the orifice 38 will be created. It will also be apparent that the pressure at the high pressure side of the orifice 38 is applied to the bottom of the piston portion 27 of the valve element 25 while the reduced or lower pressure at the low pressure side of the orifice 38 will be applied to the top side of the piston portion 27 and that when this pressure differential, i.e., the pressure drop across the orifice 38, exceeds the force of the spring 33 that the valve element 25 will be moved upwardly and will open the main valve 24, 26 an amount which is proportional to the pressure drop. The orifice 39 between the bore 37 and the chamber 28 is provided to insure against fluttering of the valve element in the bore 17 when the valve 52, 54, is opened and/or closed quickly and this orifice preferably has a bore or internal diameter which is slightly larger than the bore in the orifice 38.

With reference to FIGS. 1 and 2 of the drawings, it will be seen that the cup shaped valve element 54 is provided with a semi-spherical socket 81 in which the semi-spherical end of the rod 57 seats and that the interior side walls 82 of the cup shaped element are spaced from the rod 57 a distance sufficient to permit the element 54 to pivot or swivel upon the rod 57. This pivotal or swivel type motion permitting connection or joint between the rod 57 and the element 54 is provided to insure that the flat bottom 83 of the element 54 can and will seat properly upon the valve seat 52 even though there may be small manufacturing errors in the alignment, etc. of parts of the apparatus 10. The cup which is formed on the bottom of the disk 55 retains the valve element or poppet 54 in a position whereby the rod 57 will enter the semi-spherical socket 81 when the rod 57 is inserted through the O-ring 58 and disk 55.

It is important to note that in the practice of this invention the prssure limiting and shut-off valve 52, 54 must have a construction such that the forces of the fluid under pressure passing through it will not cause it to "chatter," and also such that the effective areas in the valve upon which fluid under pressure acts in opposition to the forces of the electromagnet do not change as the valve is opened. In the valve illustrated, the bore 50, of course, remains at a fixed diameter and when fluid acting upon the valve element 54 causes the valve to open the fluid which passes through it loses pressure at the circumferential edge of the bore 50 while that portion or area of the surface 83 upon which the fluid pressure in the bore 50 acts remains constant at all times.

From the foregoing, it is apparent that the bore 50 is not the equivalent of a nozzle or an orifice and this because the effective area of the surface 83 upon which fluid pressure acts causes the valve element 54 to function in the nature of a piston to determine the fluid forces which act counter to the forces of the electromagnet. The characteristics of the valve 52, 54 are such that when the electromagnet is unenergized there will be no build up of pressure in the passageway 50. It may be stated that the above described pressure limiting and shut-off valve structure was discovered only after repeated attempts and tests to devise such a valve. It is, of course, to be understood that while the above described valve structure is preferred, that we do not wish to be limited to the exact structure thereof since other structures may be devised for carrying out the equivalent function of the valve 52, 54.

The armature assembly of the transducer is electromagnetically urged in a direction to close the valve 52, 54 and it is urged in the opposite direction by the fluid pressure acting upon the bottom surface 83 of the valve element 54 and when this pressure overcomes a predetermined electromagnetic force of the transducer the valve will, of course, be opened to a position whereat the fluid forces acting upon the surface 83 counterbalance exactly the counteracting electromagnetic forces. Should the fluid forces acting upon the surface 83 of the valve element 54 vary in even the slightest degree, then the opening through the valve 52, 54 will be varied to adjust the pressure drop across the orifice 38 thereby causing the position of the valve element 25 and consequently the degree of opening of the valve 24, 26 to be adjusted to maintain the desired pressure in the passageway 19. It has been found during repeated tests and in the actual operation of the control valve assembly 10 that neither of its valves 24, 26 nor 52, 54 tends to "hunt" when the electric current supplied to its coil, or pressure conditions in its passageway 19 are changed and that the device responds quickly even to sudden changes in electric current and/or pressure.

From the foregoing, it will be apparent that the quantity of electric current supplied to the coil 43 is proportional to the pressure which will be maintained in the passageway 19 and that the amount of such current, and consequently the pressure in passageway 19, may be predetermined for example as by a potentiometer connected between the coil 43 and a source of direct current, not shown, and that the potentiometer may be located at any desired position with respect to the valve assembly 10, for example on a control panel located at any desired position.

It may be mentioned here that the thermistor 44 is positioned within the core 61 adjacent the coil 43 in order that it will always have substantially the same temperature as the coil and that it forms a part of the mentioned source of direct current in which it functions to adjust or compensate the output current to the coil in accordance with the temperature, or changes therein, of the latter thereby to maintain uniform electromagnetic forces upon the armature disk 66 at all times in any predetermined adjustment of the potentiometer.

The control valve assembly 10 is a "dry coil" type, that is, none of the fluid which passes through the assembly 10 reaches the coil and the transducer. Because the apparatus 10 is of the dry coil type its transducer assembly cannot become fouled with fine impurities contained in the fluid and particularly small particles of magnetic materials which may be present therein, and normally no strainers or filters are required immediately in advance of the valve to prevent such foreign particles from entering it. The "dry coil" feature of the valve has another advantage when the fluid to be handled by the valve assembly 10 is a liquid, namely, since there is no liquid contained within the body element 13 there is no "dash pot effect" upon the armature disk 66 and the elements moved by or with it and they may be moved rapidly from one position to another.

It is well known that the magnetic forces of an electromagnet acting to attract an armature to its poles exerts a force upon the armature which is inversely proportional to the square of the distance between the armature and the poles when the magnetomotive force is held constant, and for this reason the coil and core of the transducer employed in carrying out the invention are purposely made large in order that there may be a wide air gap between the armature disk 66 and the poles 62 and 63 whereby in that range (0–.002 inch) in which the armature moves the forces acting upon the armature will remain substantially constant for any given current supplied to the coil 43 and the transducer will deliver a substantially constant force within its predetermined stroke range for any given electrical input applied to it.

The spacer 79 between the armature disk 66 and the poles formed by the walls 62 and center post 63 of the core 61 functions only during the initial adjustment or calibration of the valve assembly 10 to determine the minimum possible air or non-magnetic gap between the disk 66 and poles 62 and 63 thereby to prevent excessive magnetic forces tending to close the valve 52, 54 and thereby preventing excessive fluid pressures in the valve 10 during the initial steps in the adjustment of the valve apparatus 10. In the initial adjustment of the valve assembly 10 the screw 69 is backed out of the tube 68 so that the armature disk 66 may be clamped against the spacer 79 when the coil 43 is energized. The coil 43 is then supplied with the maximum current at which it will be required to operate and fluid is pumped through the passageway 19, valve 24, 26 and the outlet port 18. With the foregoing conditions existing, the valve 52, 54 is fully opened and the screw 69 is then screwed into the tube 68 to force the rods 60 and 57 and the valve element 54 toward the seat 52 until the fluid pressure in the passageway 19 and bores 21, 37 and 50 overcomes the magnetic force of the transducer and moves the armature disk 66 slightly away from the spacer 79. The maximum pressure desired in the passageway 19 for the current being applied to the coil is then obtained by further increasing the air gap of the electromagnet by threading the screw 69 further into the tube 68 and setting the lock nut 70 to lock the screw 69 in its adjusted position. It will be obvious that the maximum desired pressure will be somewhat less than the peak pressure at which the magnetic forces of the transducer were first overcome.

While the valve apparatus 10 has thus far been described as a relief type valve, it will be apparent to those skilled in the art that merely by omitting the passageway between the wet chamber 45 and the outlet port 18 and by connecting the passageway 36 to tank that the apparatus 10 will become a sequence valve and that its outlet port 18 may be connected to another device which is to be operated by fluid pressure from the port 18.

While the form of embodiment of the present invention as herein disclosed constitutes a preferred form, it is to be understood that other forms might be adopted, all coming within the scope of the claims which follow.

We claim:

1. In an electric and fluid pressure operated valve, a body including a bore; a port and poppet in said bore, said poppet controlling the flow of fluid through said port; said poppet having a subsatntially flat end surface area which forms a valve with said port, the diameter of said flat area being greater than the diameter of said port, means defining a space in said bore extending substantially entirely around said poppet which fluid enters radially after passing over said flat area, an electromagnetically operated traction type transducer for urging said poppet toward said port including a shaft; an armature on said shaft; an electromagnet including a core having peripheral and central poles disposed to attract said armature, said shaft extending through said central pole; non-magnetic spacer means between said armature and poles for preventing said armature from closing upon said poles; an anti-friction bearing and seal means including an O-ring supporting said shaft adjacent said poppet, said anti-friction bearing and seal means dividing said bore into two compartments in one of which said poppet is contained a second seal means sealing said shaft and bore between said first seal means and electromagnet; bore between said first seal means and electromagnet; means for adjusting the relative positions of said armature and poles; motion permitting connector means between said shaft and said poppet, and means loosely locating said poppet when said shaft is withdrawn from said bore.

2. In an electric and fluid pressure operated valve, a body including a bore; a port and poppet in said bore, said poppet controlling the flow of fluid through said port; said poppet having a substantially flat end surface area which forms a valve with said port, said poppet being movable axially with respect to said port, the diameter of said flat area being greater than the diameter of said port, means defining a space in said bore extending substantially entirely around said poppet, and outlet passage communicating with said space, an electromagnetically operated traction type transducer for urging said poppet toward said port including a shaft; an armature on said shaft; an electromagnet including a core having peripheral and central poles disposed to attract said armature, said shaft extending through said central pole; an anti-friction bearing and seal means including an O-ring supporting said shaft adjacent said poppet, said anti-friction bearing and seal means dividing said bore into two compartments in one of which said poppet is contained; outlet passage means for each of said compartments; a second seal means sealing said shaft and bore between said first seal means and electromagnet; means for adjusting the relative positions of said armature and poles, and motion permitting connector means between said shaft and said poppet.

3. In an electric and fluid pressure operated valve, a body including a bore; a port and poppet in said bore, said poppet controlling the flow of fluid through said port; said poppet having a substantially flat end surface area which forms a valve with said port, said poppet being movable axially with respect to said port, the diameter of said flat area being greater than the diameter of said port, means defining a space in said bore extending substantially entirely around said poppet into which fluid flows after passing through said port, and electromagnetically operated traction type transducer for urging said poppet toward said port including a shaft; an armature on said shaft; an electromagnet including a core having peripheral and central poles disposed to attract said armature, said shaft extending through said central pole; an anti-friction bearing and seal means including an O-ring supporting said shaft adjacent said poppet, said anti-friction bearing and seal means dividing said bore into two compartments in one of which said poppet and space around said poppet is contained; outlet passage means for each of said compartments; a second seal means sealing said shaft and bore between said first seal means and electromagnet, and means for adjusting the relative positions of said armature and poles.

4. In an electric and fluid pressure operated valve, a body having a bore; a port in said bore and a poppet for controlling the flow of fluid through said port; said poppet having a substantially flat end surface area which forms a valve with said port, said poppet being movable axially with respect to said port, the diameter of said flat area being greater than the diameter of said port, means defining a space in said bore extending substantially entirely around said poppet into which fluid flows after passing through said port, an electromagnetically operated transducer for urging said poppet toward said port including a shaft; an armature on said shaft; an electromagnet for moving said armature; means for guiding said shaft including a flexible element adjacent said armature and an anti-friction bearing and seal means including an O-ring supporting said shaft adjacent said poppet, said anti-friction bearing and seal means cooperating with said bore to form a compartment in which said poppet and said space around said poppet is contained; outlet passage means for said compartment; means for adjusting the relative positions of said armature and electromagnet, and motion permitting connector means between said shaft and poppet.

5. In an electric and fluid pressure operated valve, a body having a bore; a port in said bore and a poppet for controlling the flow of fluid through said port; said poppet having a substantially flat end surface area which forms a valve with said port, said poppet being movable axially with respect to said port, the diameter of said flat area being greater than the diameter of said port, means defining a space in said bore extending substantially entirely around said poppet into which fluid flows after passing through said port, an electromagnetically operated transducer for urging said poppet toward said port including a shaft; an armature, and means for guiding said shaft including a flexible element adjacent said armature and an anti-friction bearing and seal means including an O-ring supporting said shaft adjacent said poppet, said anti-friction bearing and seal means cooperating with said bore to form a compartment in which said poppet and space therearound is contained, and drain means for said compartment.

6. A transducer and fluid pressure operated valve including a bore; a port and poppet in said bore, said poppet controlling the flow of fluid through said port, said poppet having a substantially flat end face which forms a valve with said port, the diameter of said face being larger than the diameter of said port so that said face extends outwardly beyond said port, means defining a space in said bore extending substantially entirely around said face which fluid enters radially after passing over said face, a transducer for urging said poppet toward said port including a shaft; means for guiding said shaft including an anti-friction bearing and seal means supporting said shaft adjacent said poppet, said anti-friction bearing and seal means dividing said bore into two compartments in one of which said poppet is contained, the other of said compartments having a vent port, and a second seal means sealing said shaft and bore and closing the said other compartment between said anti-friction bearing and seal means and said transducer.

7. In an electric and fluid pressure operated valve, a body including a bore; a port and poppet in said bore, said poppet controlling the flow of fluid through said port; said poppet having a substantially flat end surface area which forms a valve with said port, said poppet being movable axially with respect to said port, the diameter of said flat area being greater than the diameter of said port, means defining a space in said bore extending substantially entirely around said poppet into which fluid flows after passing through said port, an electromagnetic transducer for urging said poppet toward said port including a shaft; means for guiding said shaft including an anti-friction bearing and seal means supporting said shaft adjacent said poppet, said anti-friction bearing and seal means dividing said bore into two compartments in one of which said poppet and said space around said poppet is contained, outlet passage means for each of said compartments, and a second seal means sealing said shaft and bore between said anti-friction bearing and seal means and said transducer.

8. An electromagnetically and fluid pressure operated valve comprising a body presenting a seat having a port for connection to a source of pressure fluid, a poppet controlling the flow of said fluid through said port, said poppet having a flat continuous end face which forms a poppet valve with said seat, the diameter of said face being larger than the diameter of said port so that said face extends outwardly over said seat beyond said port, means defining a space extending substantially entirely around said face which fluid enters radially after flowing over said face, an electromagnet for urging said poppet toward said seat, said electromagnet comprising a coil mounted in a cup-shaped magnetic core having poles defined by a side wall and a hollow center post, a non-magnetic shaft extending movably through said center post, said poppet being loosely mounted to said shaft at one end thereof by a connection including a recessed hemispherical axial socket in said poppet and a rounded surface on said end of said shaft, said surface being seated in said socket, the walls of said poppet adjacent said socket being spaced from said shaft, said poppet being tiltable with respect to said shaft, said shaft at its other end being mounted to a disk-like armature which extends to the side wall of said core, and means preventing the armature from closing upon said poles.

9. A control valve mechanism for use in a fluid system, said valve comprising a body having a bore, a fixed seat member and a poppet member movable axially with respect thereto in said bore, said seat member having a port, said poppet member having a flat continuous end face which forms a poppet valve with said seat member, the diameter of said face being larger than the diameter of said port so that said face overhangs said port, a chamber around said poppet valve for receiving fluid flowing therethrough, an electromagnetic transducer including a coil, a shaft extending through said coil for operating said poppet member, ball and socket connector means tiltably journalling said poppet axially at one end of said shaft whereby said end face of said poppet is self-aligning with said seat member, a disk-like armature attached to said shaft and overhanging said coil for operating said shaft, pole means adjacent said armature, means preventing said armature from closing upon said pole means, and means for adjusting the air gap between said armature and pole means, said transducer maintaining said poppet valve closed until the pressure at said port acting upon said poppet member overcomes the force of said transducer and thereafter the force of said transducer controlling said poppet member to maintain the pressure at said port substantially constant.

References Cited by the Examiner

UNITED STATES PATENTS

| | | | |
|---|---|---|---|
| 487,991 | 12/1892 | Callahan | 137—491 |
| 2,031,478 | 2/1936 | Gray | 137—596 |
| 2,568,026 | 9/1951 | Pigott | 137—540 X |
| 2,578,795 | 12/1951 | Gardiner et al. | 137—491 X |
| 2,619,111 | 11/1952 | Renick | 137—489 |
| 2,796,885 | 6/1957 | Garrett et al. | 137—491 |
| 2,934,090 | 4/1960 | Kenann et al. | 251—129 X |

MARTIN P. SCHWADRON, *Primary Examiner.*